US012799031B2

(12) United States Patent
Walker

(10) Patent No.: US 12,799,031 B2
(45) Date of Patent: Nov. 17, 2026

(54) SYSTEM AND METHOD FOR MANUFACTURING CALCINED GYPSUM WITH TEMPERATURE CONTROL MECHANISM

(71) Applicant: United States Gypsum Company, Chicago, IL (US)

(72) Inventor: Blair C. Walker, Almonte (CA)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 487 days.

(21) Appl. No.: 18/496,687

(22) Filed: Oct. 27, 2023

(65) Prior Publication Data

US 2025/0136504 A1 May 1, 2025

(51) Int. Cl.

| | |
|---|---|
| ***C04B 11/036*** | (2006.01) |
| ***B01J 4/00*** | (2006.01) |
| ***B01J 6/00*** | (2006.01) |
| ***B01J 19/00*** | (2006.01) |
| ***C04B 11/028*** | (2006.01) |
| ***F27B 15/00*** | (2006.01) |
| ***F27B 15/18*** | (2006.01) |
| ***F27B 15/20*** | (2006.01) |

(52) U.S. Cl.

CPC ............. *C04B 11/036* (2013.01); *B01J 4/008* (2013.01); *B01J 6/001* (2013.01); *B01J 19/0013* (2013.01); *C04B 11/0281* (2013.01); *F27B 15/00* (2013.01); *F27B 15/18* (2013.01); *F27B 15/20* (2013.01); *B01J 2219/00058* (2013.01)

(58) Field of Classification Search

CPC . F27B 15/18; F27B 15/20; B01J 4/008; B01J 6/001; B01J 19/0013

See application file for complete search history.

(56) References Cited

U.S. PATENT DOCUMENTS

| | | | |
|---|---|---|---|
| 3,359,146 A | 12/1967 | Lane et al. | |
| 3,773,892 A * | 11/1973 | Reimann et al. ..... | C04B 11/036 432/15 |
| 4,113,836 A * | 9/1978 | O'Connor ........... | C04B 11/0281 432/151 |

(Continued)

FOREIGN PATENT DOCUMENTS

| | | |
|---|---|---|
| CN | 102807334 A | 12/2012 |
| CN | 211255729 U | 8/2020 |
| CN | 217809205 U * | 11/2022 |

OTHER PUBLICATIONS

European Patent Office, International Search Report and Written Opinion in International Patent Application No. PCT/US2024/052305 Feb. 17, 2025).

*Primary Examiner* — Ko-Wei Lin

(74) *Attorney, Agent, or Firm* — Pradip Sahu; Greer, Burns & Crain, Ltd

(57) ABSTRACT

Embodiments of a system and a method for manufacturing calcined gypsum can include a calcination unit having a heating unit with at least one variable heater and a calciner temperature control device having a temperature sensor and a controller in operable arrangement with the temperature sensor and the heating unit. The calciner temperature control device is configured to adjust a thermal energy output rate of the heating unit based upon a comparison of the detected temperature and a target set point temperature so as to allow the supply of gypsum to be fed into the calcining chamber at a constant rate.

20 Claims, 3 Drawing Sheets

(56) References Cited

U.S. PATENT DOCUMENTS

| | | | | |
|---|---|---|---|---|
| 5,320,677 | A | 6/1994 | Baig | |
| 8,343,273 | B1 * | 1/2013 | Lettkeman | C04B 20/1018 427/372.2 |
| 2023/0373854 | A1 * | 11/2023 | Woollacott | F27D 17/10 |
| 2025/0345766 | A1 * | 11/2025 | Bogaerts | B01F 35/2211 |

* cited by examiner

SYSTEM AND METHOD FOR MANUFACTURING CALCINED GYPSUM WITH TEMPERATURE CONTROL MECHANISM

BACKGROUND

The present disclosure relates to systems and methods for calcining gypsum, such as, e.g., is used in continuous cementitious board manufacturing processes, and, more particularly, to a system and method for calcining gypsum which includes a calcination unit and a calciner temperature control system.

Calcium sulfate materials are available in several forms or phases that are simplified as follows: calcium sulfate dihydrate-$CaSO_4 \cdot 2H_2O$ (commonly known as gypsum); calcium sulfate hemihydrate-$CaSO_4 \cdot \frac{1}{2}H_2O$ (commonly known as stucco); and calcium sulfate-$CaSO_4$ (commonly known as anhydrite). In many types of cementitious articles, set gypsum (calcium sulfate dihydrate) is often a major constituent. For example, set gypsum is a major component of end products created by use of traditional plasters (e.g., plaster-surfaced internal building walls), and also in faced gypsum board employed in typical drywall construction of interior walls and ceilings of buildings. In addition, set gypsum is the major component of gypsum/cellulose fiber composite boards and products, as described in U.S. Pat. No. 5,320,677, for example. Typically, such gypsum-containing cementitious products are made by preparing a mixture of calcined gypsum (comprising calcium sulfate hemihydrate alpha or beta and/or calcium sulfate anhydrite), water, and other components, as appropriate to form cementitious slurry. The cementitious slurry and desired additives are often blended in a continuous mixer, as described in U.S. Pat. No. 3,359,146, for example.

The mixture typically is cast into a pre-determined shape or onto the surface of a substrate. The calcined gypsum reacts with the water to form a matrix of crystalline hydrated gypsum, i.e., calcium sulfate dihydrate. It is the desired hydration of calcined gypsum that enables the formation of an interlocking matrix of set gypsum, thereby imparting strength to the gypsum structure in the gypsum-containing product.

Calcined gypsum is typically made by crushing gypsum rock and then heating the gypsum to calcine (dehydrate) the calcium sulfate dihydrate into preferably calcium sulfate hemihydrate. In addition to natural gypsum rock, the use of synthetic gypsum, such as, e.g., flue gas desulphurization gypsum or gypsum from chemical processes can be used as well.

When gypsum, (i.e., calcium sulfate dihydrate) is calcined, water is removed from the calcium sulfate molecular structure. When one and a half molecules of water are removed from the molecular structure of gypsum, the hemihydrate results, a material used in various compositions in which rehydration occurs during the setting process subsequent to the addition of the water. When two molecules of water are removed from the molecular structure of gypsum, anhydrite results.

For example, gypsum ($CaSO_4 \cdot 2H_2O$) powder, from sources such as rocks of natural gypsum crushed to make gypsum powder or synthetic gypsum made to be a powder, is heated to calcine into stucco. With appropriate thermal energy, the gypsum powder converts to hemihydrate ($CaSO_4 \cdot \frac{1}{2}H_2O$). If the hemihydrate is exposed to even greater thermal energy, the gypsum can convert to soluble anhydrite ($CaSO_4$) or insoluble anhydrite (often referred to as "dead burn").

Kettle calcination temperature is normally controlled by monitoring the temperature of the gypsum material in the kettle or stucco exiting the kettle and controlling the gypsum feed rate into the kettle to adjust the stucco temperature. For example, if the monitored stucco temperature is deemed too high, the feed rate of the gypsum into the kettle is increased, thereby causing an increase in the amount of cooler gypsum inside the kettle which causes the temperature within the kettle to decrease. If the monitored stucco temperature is deemed too low, the feed rate of the gypsum into the kettle decreased, thus allowing the temperature within the kettle to rise. Using conventional kettle burners, the burners provide limited control capability as the refractory of a conventional kettle acts as a heat sink that causes a lagging effect of heating/cooling from changing burner input energy into to the kettle process.

Additionally, in a conventional kettle, a significant amount of thermal energy from the heat source is transferred throughout the kettle bottom. Calcined stucco in contact with the bottom releases steam which acts as fluidizing agent as the steam rises upwards through the kettle material. The calcination steam acting as a fluidizing agent is the primary mechanism for movement of material within the kettle, which can sometimes be aided by a mechanical stirring system. Traditionally, if a burner system were used to control stucco temperature of a conventional kettle, it can sometime affect the rate of fluidization in the kettle, leading to various quality and operation issues of the conventional kettle.

There is a continued need in the art to provide additional solutions to enhance the production of cementitious articles. For example, there is a continued need for improving techniques for producing calcined gypsum. As an example, there is a continued need for techniques for producing calcined gypsum from a calciner that yields a consistent product with efficient usage of energy.

It will be appreciated that this background description has been created to aid the reader and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims and not by the ability of any disclosed feature to solve any specific problem noted herein.

SUMMARY

In one aspect, the present disclosure is directed to embodiments of a system for manufacturing calcined gypsum. In embodiments, a system for manufacturing calcined gypsum includes a calcination unit and a calciner temperature control device.

In one embodiment, a system for manufacturing calcined gypsum includes a calcination unit and a calciner temperature control device. The calcination unit includes a calcining chamber and a heating unit associated with the calcining chamber. The calcining chamber includes an inlet for receiving a supply of gypsum therethrough and into the calcining chamber and an outlet for discharging the supply of gypsum from the calcining chamber.

The calciner temperature control device includes a temperature sensor and a controller in operable arrangement with the temperature sensor and the heating unit. The temperature sensor is positioned to detect at least one of the temperature within the calcining chamber and the temperature at a discharge portion adjacent and downstream of the outlet. The temperature sensor is configured to generate a temperature signal indicative of the temperature measured by the temperature sensor. The controller is configured to adjust a thermal energy output rate of the heating unit based upon a comparison of the temperature signal and a target set point temperature.

In another aspect, the present disclosure describes embodiments of a method of manufacturing calcined gypsum. In one embodiment, a method of manufacturing calcined gypsum includes feeding a supply of gypsum at a feed rate into a calcining chamber of a calcination unit. The calcination unit includes a heating unit having at least one variable heater associated with the calcining chamber.

Temperature within the calcining chamber is monitored using a temperature sensor positioned to detect at least one of the temperature within the calcining chamber and the temperature at a discharge portion adjacent and downstream of an outlet of the calcining chamber. The temperature sensor is configured to generate a temperature signal indicative of the temperature measured by the temperature sensor.

The temperature signal is transmitted to a controller in operable arrangement with the temperature sensor and the heating unit. The controller is operated to adjust a thermal energy output rate of the heating unit by adjusting at least one variable heater of the heating unit based upon a comparison of the temperature signal and a target set point temperature.

Further and alternative aspects and features of the disclosed principles will be appreciated from the following detailed description and the accompanying drawings. As will be appreciated, the systems and techniques for manufacturing calcined gypsum that are disclosed herein are capable of being carried out and used in other and different embodiments, and capable of being modified in various respects. Accordingly, it is to be understood that both the foregoing general description and the following detailed description are exemplary and explanatory only and do not restrict the scope of the appended claims.

Figure 1:
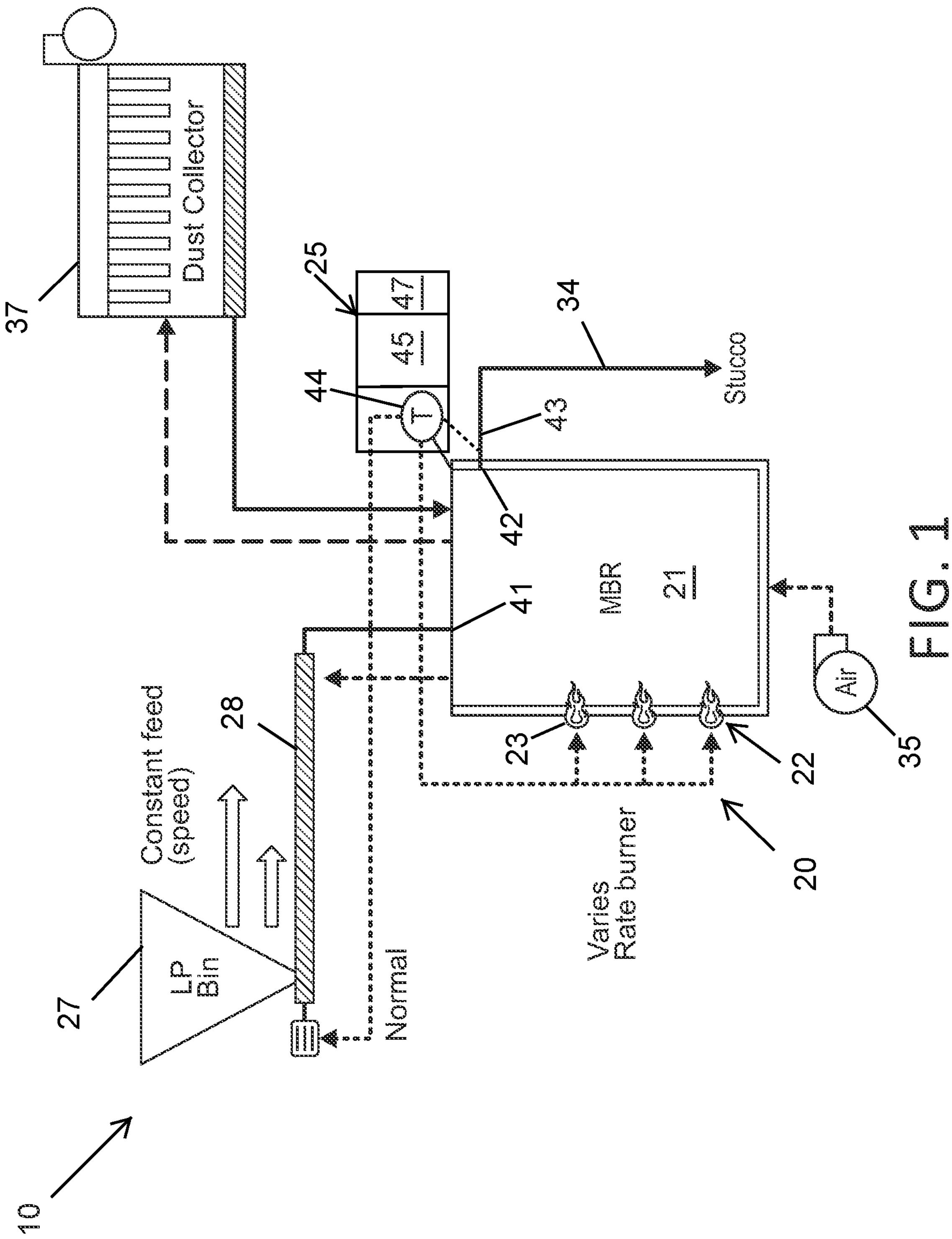
FIG. 1 is a schematic plan diagram of an embodiment of a system for manufacturing calcined gypsum constructed in accordance with principles of the present disclosure.

It should be understood that the drawings are not necessarily to scale and that the disclosed embodiments are illustrated diagrammatically and in partial views. In certain instances, details which are not necessary for an understanding of this disclosure or which render other details difficult to perceive have been omitted. It should be understood that this disclosure is not limited to the particular embodiments illustrated herein.

DETAILED DESCRIPTION OF EXEMPLARY EMBODIMENTS

The present disclosure provides various embodiments of a system and a method for manufacturing calcined gypsum that include means and a step for controlling the temperature within a calcining chamber of a calcination unit so as to be able to feed a supply of gypsum into the calcining chamber at a relatively constant rate. In embodiments of systems and methods for manufacturing calcined gypsum following principles of the present disclosure, a calcination unit that includes a heating unit with at least one variable heater, which in embodiments can be a variable burner and/or electrical heating element, and a calciner temperature control device that is configured to adjust a thermal energy output rate of the heating unit based upon a comparison of the detected temperature and a target set point temperature within the calcining chamber.

In embodiments, the means and step for means and a step for controlling the temperature within a calcining chamber of a calcination unit can comprise a heating unit associated with a calcining chamber that includes at least one variable heating source, such as, e.g., a variable burner and/or electrical heating element, a temperature sensor positioned to detect the temperature within the calcining chamber, and a controller configured to adjust a thermal energy output rate of the heating unit based upon a comparison of the temperature signal and a target set point temperature within the calcining chamber. The feed rate of the supply of gypsum into the calcining chamber can be kept at a constant rate to achieve a desired retention time in the calcination chamber.

In embodiments, a method of manufacturing calcined gypsum includes varying at least one variable heater of a calcination unit based upon a temperature signal received from a temperature sensor positioned to detect at least one of the temperature within the calcining chamber and the temperature at a discharge portion adjacent and downstream of an outlet of the calcination unit.

In embodiments, systems and methods are provided in which stucco temperature is measured via a temperature sensor and the thermal energy output rate of the heating unit is varied based upon the temperature sensor measurement to achieve a desired stucco. In embodiments, systems and methods are provided in which aspects of stucco phase/quality are measured using one or more sensors and the thermal energy output rate of the heating unit is varied in response to those sensor readings to maintain the specific phase/quality. For example, in embodiments, stucco phase/quality can be measured with NIR, XRD, combined water, or other metrics/devices.

Embodiments of a system and a method for manufacturing calcined gypsum following principles of the present disclosure can be used to produce stucco over a range of correlated target set point temperatures for the calcining chamber and feed rates of the supply of gypsum into the calcining chamber which affects retention time in the calcination chamber to follow a predetermined calcination curve of temperature versus time. Embodiments of a system and a method for manufacturing calcined gypsum following principles of the present disclosure can be used to produce stucco at a relatively low calcining temperature in the calcining chamber thereby resulting in lower operating calcination energy requirements. In embodiments, a target set point temperature can be less than or equal to 330° F., and in a range between 180° F. and 300° F. in yet other embodiments, and in a range between 270° F. and 280° F. in still other embodiments. In embodiments, the stucco calcination temperature within the calcination chamber is controlled by modulating at least one variable burner and/or electrical heating element of the heating unit of the calcination unit.

Embodiments of a system and a method for manufacturing calcined gypsum following principles of the present disclosure can be used to produce stucco using a calcining chamber temperature control technique by adjusting at least one variable burner and/or electrical heating element based upon a detected temperature within the calcining chamber in comparison to a desired set point temperature. In such embodiments, a kettle feed bin can be eliminated or reduced in size based upon a reliable desired constant feed rate into the calcining chamber. The capital expense of a mill building structure housing such an arrangement can therefore be reduced.

Turning now to the Figures, an embodiment of a system 10 for manufacturing calcined gypsum constructed in accordance with principles of the present disclosure is shown in FIG. 1. The illustrated system 10 for manufacturing calcined gypsum includes a calcination unit 20, a calciner temperature control device 25, a source of gypsum 27 in the form of land plaster powder, a feeder conveyor 28 configured to selectively deliver a supply of gypsum powder to the calcination unit 20, and a discharge conveyor 34. It will be understood by one skilled in the art that the system 10 for manufacturing calcined gypsum can include other known subsystems that are not shown in FIG. 1.

The calcination unit 20 includes a calcining chamber 21 and a heating unit 22 associated with the calcining chamber 21 for providing heat for calcination. The calcining chamber 21 includes an inlet 41 for receiving a supply of gypsum therethrough and into the calcining chamber 21 and an outlet 42 for discharging the supply of gypsum from the calcining chamber as a discharge stream of calcined gypsum (generally referred to as "stucco") from the calcining chamber 21.

The calcining chamber 21 is configured such that the feed rate of the supply of gypsum through the inlet 41 into the calcination chamber 21 is inversely proportional to the retention time of the supply gypsum in the calcining chamber 21 until it is discharged from the outlet 42. In particular, the higher the feed rate of the supply of gypsum into the calcining chamber the lower the retention time of the supply of gypsum into the calcining chamber before being discharged therefrom, and vice versa.

In embodiments, the heating unit 22 includes at least one variable heater such as a variable burner and/or electrical heating element 23. Each variable burner can be operated using any suitable fuel, such as, natural gas, petroleum gas, oil, coal, etc. Each variable electrical heating element can be operated using any suitable electricity source. Fuel and air can be introduced to each burner and/or electricity to each electrical heating element of the heating unit 22 to be burned and the hot gases are then provided in, and/or electrical heat transferred to, the calcining chamber 21. The illustrated embodiment includes a plurality of variable burners and/or electrical heating elements 23. In particular, in the illustrated embodiment, the calcination unit 20 comprises a refractoryless kettle with a heating unit 22 that has a plurality of variable burners and/or electrical heating elements, frequently referred to as a "multi-burner refractoryless (MBR) kettle." In embodiments, the calcination unit 20 can be any suitable, commercially-available MBR kettle.

In the illustrated embodiment, the MBR kettle 20 includes a fluidizing air unit 35 and a dust collector 37. In embodiments, the air unit 35 can be any suitable air unit suitable for the calcining chamber 21. The air unit 35 is associated with the calcining chamber 21 and configured to direct a flow of air into the calcining chamber 21. The fluidizing air unit 35 can be configured to fluidize the contents of the calcination chamber. In embodiments, fluidizing can be performed via air introduced into the calcining chamber 21 through fluidizing/aeration pads at the bottom of the calciner chamber 21.

The dust collector 37 is associated with the calcining chamber 21 and is configured to selectively control dust generation within the calcining chamber 21. In embodiments, the dust collector 37 can be any suitable dust collector suitable for abating the amount of dust emitted from the calcination unit 20.

In embodiments, the calcination unit 20 can comprise any suitable MBR kettle. In other embodiments, the calcination unit 20 can comprise a suitable commercially-available high-efficiency kettle (HEK) or a hybrid design of MBR/HEK.

The calciner temperature control device 25 includes a temperature sensor 44 and a controller 45 in operable arrangement with the temperature sensor 44, the feeder conveyor 28, and the heating unit 22. In embodiments, the temperature sensor 44 is positioned to detect at least one of the temperature within the calcining chamber and the temperature at a discharge portion 43 adjacent and downstream of the outlet 42 of the calcining chamber 21. In the illustrated embodiment, the temperature sensor 44 is positioned to detect the temperature within the calcining chamber 21. The temperature sensor 44 is configured to generate a temperature signal indicative of the temperature measured by the temperature sensor. In embodiments, any suitable commercially-available temperature sensor can be used. In embodiments, the temperature sensor 44 is arranged so that it detects the temperature within the calcining chamber 21 (and/or adjacent and downstream of the outlet 42) in a real-time manner.

In embodiments, the controller 45 is configured to adjust at least one operating parameter of the calcination unit 20 based upon the temperature signal received from the temperature sensor 44. In embodiments, the controller 45 is configured to adjust a thermal energy output rate of the heating unit 22 based upon a comparison of the temperature signal and a target set point temperature within the calcining chamber 21. In embodiments, the target set point temperature can be any suitable temperature. In embodiments, the target set point temperature can be based upon a feed rate of the supply of gypsum entering the inlet 41 of the calcining chamber 21. In embodiments, the target set point temperature within the calcining chamber is less than or equal to 330° F., and in a range between 180° F. and 300° F. in yet other embodiments, and in a range between 270° F. and 280° F. in still other embodiments.

In embodiments, the controller 45 is configured to adjust the thermal energy output rate of the heating unit 22 by adjusting each one of the variable heating sources, e.g., variable burners and/or electrical heating elements 23, based upon the temperature signal. In embodiments, the controller 45 is configured to independently adjust each one of the variable burners and/or electrical heating elements 23 based upon the temperature signal.

In embodiments, the controller 45 includes a data storage device 47. The controller 45 is configured to vary the target set point temperature based upon a change in the feed rate of the supply of gypsum entering the calcining chamber according to achieve the desire degree of calcination, similar to the temperature time curve, such as those shown in FIGS. 2 and 3, which can be stored in the data storage device 47.

Figure 2:
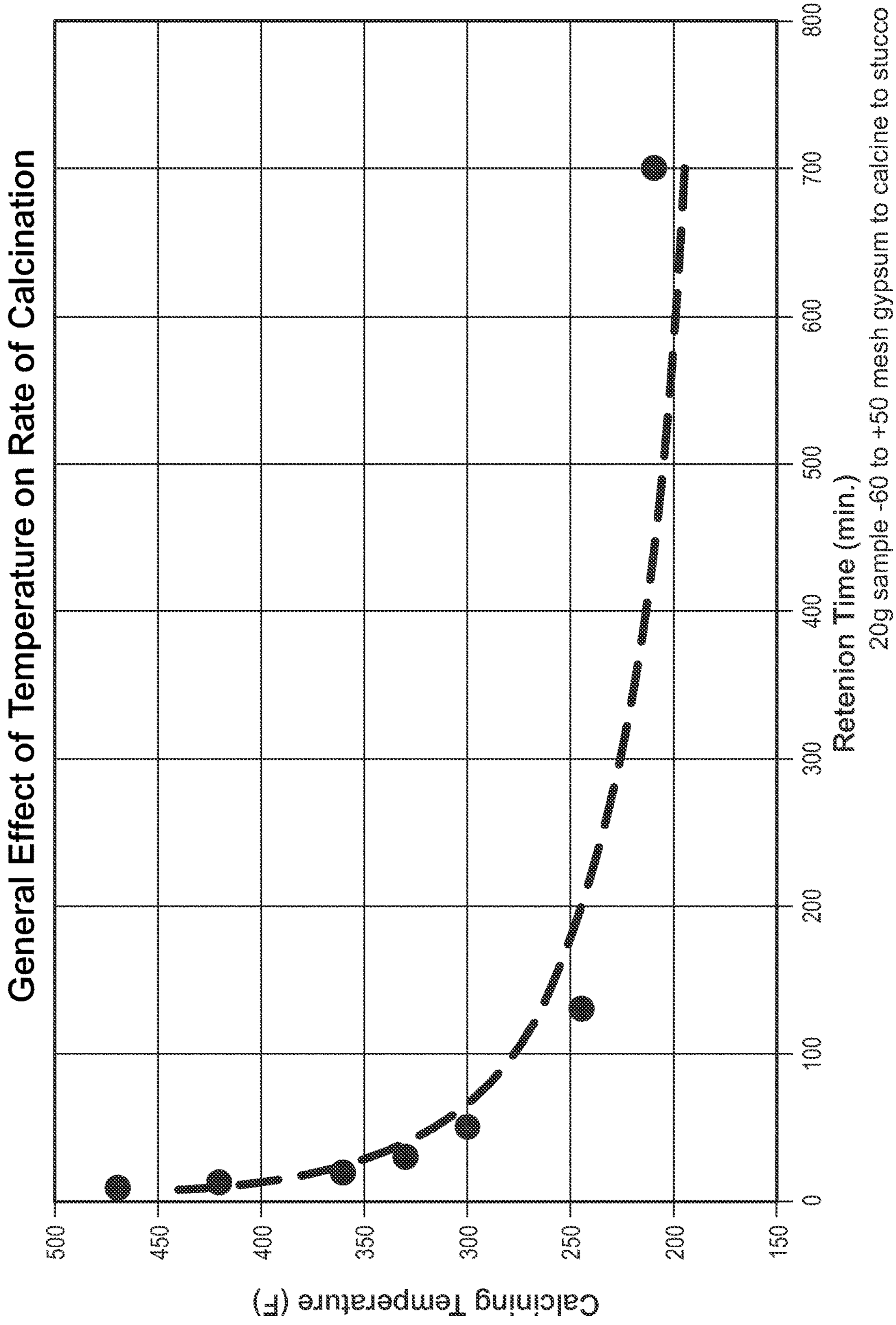
FIG. 2 is a graph of calcining temperature versus retention time to show the effect of temperature on the rate of calcination of stucco to a calcination ratio of one hundred percent.
Figure 3:
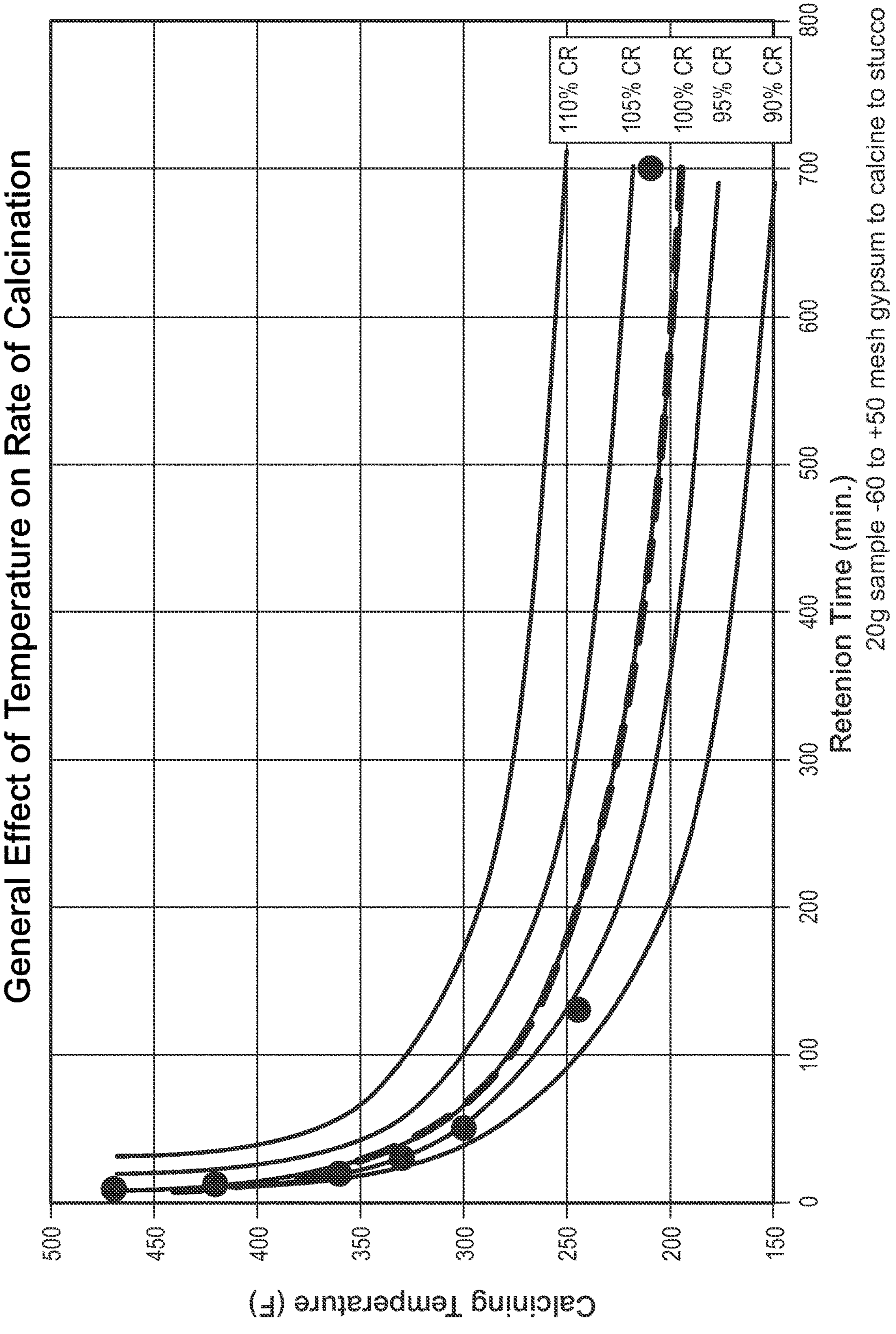
FIG. 3 is a graph of calcining temperature versus retention time to show the effect of temperature on the rate of calcination of stucco to a proposed approximation trend of theoretical calcination ratio in a range from ninety percent to one hundred ten percent.

FIG. 2 is a graph of calcining temperature versus retention time to show the effect of temperature on the rate of calcination of stucco to a calcination ratio of one hundred percent. FIG. 3 is a graph of calcining temperature versus retention time to show the effect of temperature on the rate of calcination of stucco to a calcination ratio in a range from ninety percent to one hundred ten percent. FIGS. 2 and 3 depict the temperature-time log relation for calcination of a twenty gram sample of gypsum powder of −60 to +50 mesh. As depicted in FIGS. 2 and 3, the shorter the landplaster residence time, the higher the calcining temperature is required to properly calcine the gypsum. Similarly the lower the calcining temperature, the longer the retention time required.

Referring back to FIG. 1, the source of gypsum 27 associated with the feeder conveyor 28 is configured to selectively deliver the supply of gypsum 27 to the feeder conveyor 28. In embodiments, the source of gypsum 27 can be any suitable gypsum, such as, for example land plaster as illustrated in FIG. 1. In embodiments, the source of gypsum 27 is arranged with an inlet 41 of the calcination chamber 21 to provide a feed stream of gypsum to the calcination unit 20. In the illustrated embodiment, the source of gypsum 27 is associated with a feeder conveyor 28 to selectively deliver the supply of gypsum powder to the calcination unit 20 via the feeder conveyor 28. The feeder conveyor 28 is configured to direct the feed stream from the source of gypsum 27 to the calcining chamber 21 of the calcination unit 20 via the inlet 41. The feeder conveyor 28 is configured to feed the supply of gypsum at a feed rate into the calcining chamber 21. In embodiments, the target set point temperature is based upon the feed rate of the supply of gypsum 27 entering the calcining chamber 21 via the inlet 41 to achieve a suitable calcination rate based upon the retention time of the gypsum within the calcining chamber 21 based upon its feed rate into the chamber 21.

The calcined gypsum can be ground or milled to a desired particle size range, which can be performed separately from calcination and can be performed before and/or after calcination. Milling and calcining may be performed in consecutive steps in different units or may be performed in one stage in a single unit.

After calcination, the calcined gypsum can be discharged from the outlet 42 of the calcining chamber 21. In embodiments, the discharge conveyor 34 transports the discharge stream of calcined gypsum from the calcination unit 20 to a suitable storage location, such as a stucco bin 31, for example, or directly to the boardline without passing through a stucco bin for ready use.

In embodiments, the temperature sensor 44 is in electrical communication, via the controller 45, with the heating unit 22 of the calcination unit 20 and/or the feeder conveyor 28 to form a feedback control loop based upon the temperature signal according to principles discussed herein. In embodiments, the controller 45 is configured to adjust a temperature profile of the calcining chamber 44 based upon the temperature signal received from the temperature sensor 44. In embodiments, the controller 45 is configured to selectively adjust the feed rate of the supply of gypsum based upon the temperature signal to achieve a desired calcination rate, such as by controlling the speed of the feeder conveyor 28 and/or the mass flow rate of gypsum fed onto the feeder conveyor 28 from the source of gypsum 27.

In embodiments, the calciner temperature control device 25 can include a processor and a non-transitory computer readable medium bearing a calciner control application. The processor is in communication with the temperature sensor 44 to receive the temperature data therefrom.

In embodiments, the calciner temperature control device 25 can include a user input and/or interface device having one or more user-actuated mechanisms (e.g., one or more push buttons, slide bars, rotatable knobs, a keyboard, and a mouse) adapted to generate one or more user actuated input control signals. In embodiments, the calciner temperature control device 25 can be configured to include one or more other user-activated mechanisms to provide various other control functions for the calciner 10, as will be appreciated by one skilled in the art. The calciner temperature control device 25 can include a display device adapted to display a graphical user interface. The graphical user interface can be configured to function as both a user input device and a display device in embodiments. In embodiments, the display device can comprise a touch screen device adapted to receive input signals from a user touching different parts of the display screen. In embodiments, the processor of the calciner temperature control device 25 can be in the form of a smart phone, a tablet, a personal digital assistant (e.g., a wireless, mobile device), a laptop computer, a desktop computer, or other type of device.

In embodiments, the processor is in operable arrangement with the non-transitory computer-readable medium to execute the control application contained thereon. The processor can be in operable arrangement with a display device to selectively display output information from the control application and/or to receive input information from a graphical user interface displayed by the display device.

In embodiments, the processor can comprise any suitable computing device, such as, a microprocessor, a mainframe computer, a digital signal processor, a portable computing device, a personal organizer, a device controller, a logic device (e.g., a programmable logic device configured to perform processing functions), a digital signal processing (DSP) device, or a computational engine within an appliance. In embodiments, the processor also includes one or more additional input devices (e.g., a keyboard and a mouse).

The processor can have one or more memory devices associated therewith to store data and information. The one or more memory devices can include any suitable type, including volatile and non-volatile memory devices, such as RAM (Random Access Memory), ROM (Read-Only Memory), EEPROM (Electrically-Erasable Programmable Read-Only Memory), flash memory, etc. In one embodiment, the processor is adapted to execute programming stored upon a non-transitory computer readable medium to perform various methods, processes, and modes of operations in a manner following principles of the present disclosure.

In embodiments, the non-transitory computer readable medium can contain a control application that is configured to implement an embodiment of a method for manufacturing calcined gypsum according to principles of the present disclosure. In embodiments, the control application includes a graphical user interface that can be displayed by the display device. The graphical user interface can be used to facilitate the inputting of commands and data by a user to the control application and to display outputs generated by the control application.

The control application can be stored upon any suitable computer-readable storage medium. For example, in embodiments, a control program following principles of the present disclosure can be stored upon a hard drive, floppy disk, CD-ROM drive, tape drive, zip drive, flash drive, optical storage device, magnetic storage device, and the like.

In embodiments of a method for manufacturing calcined gypsum following principles of the present disclosure, a system for manufacturing calcined gypsum constructed according to principles of the present disclosure is used to make calcined gypsum as discussed herein. In embodiments, a method for manufacturing calcined gypsum following principles of the present disclosure can be used with any embodiment of a system for manufacturing calcined gypsum constructed according to principles discussed herein.

In embodiments of a method for manufacturing calcined gypsum according to principles of the present disclosure, stucco can be produced over a range of correlated target set point temperatures for the calcining chamber and feed rates of the supply of gypsum into the calcining chamber. Embodiments of method for manufacturing calcined gypsum following principles of the present disclosure can be used to produce stucco at a relatively low calcining temperature in the calcining chamber, such as, a target set point temperature less than or equal to 330° F., and in a range between 180° F. and 300° F. in yet other embodiments, and in a range between 270° F. and 280° F. in still other embodiments.

In embodiments, a stucco target set point temperature can be set, and the heating unit of the calcination unit appropriately adjusted to meet the temperature target. The feed rate of the supply of gypsum into the calcining chamber can be adjusted to affect the retention time of the gypsum in the calcining chamber in order to achieve a desired calcination ratio according to a predetermined temperature versus time comparison, such as is shown in FIG. 3. For example, an increase in retention time at a given target set point temperature provides the supply of gypsum inside the calcining chamber with more time exposure to energy to complete reaction to stucco. In embodiments, such a control technique can allow for more efficient energy consumption while maintaining acceptable stucco quality and acceptable burner emissions.

In embodiments, a controller is configured to feed a supply of gypsum into a calcining chamber at a constant feed rate to maintain the average retention time of material in the calcining chamber within a predetermined tolerance. The controller is configured to adjust the heating unit by varying at least one burner and/or electrical heating element to ramp up and down according to a detected temperature within the calcining chamber in comparison to a stucco target set point temperature. In embodiments, the heating unit is controlled via a PID loop.

In embodiments following principles of the present disclosure, a method of manufacturing calcined gypsum includes varying at least one variable burner and/or electrical heating element of a calcination unit based upon a temperature signal received from a temperature sensor positioned to detect at least one of the temperature within the calcining chamber and the temperature at a discharge portion adjacent and downstream of an outlet of a calcining chamber of the calcination unit. In one embodiment, a method of manufacturing calcined gypsum includes feeding a supply of gypsum at a feed rate into a calcining chamber of a calcination unit. The calcination unit includes a heating unit having at least one variable burner and/or electrical heating element associated with the calcining chamber.

Temperature is monitored using a temperature sensor positioned to detect at least one of the temperature within the calcining chamber and the temperature at a discharge portion adjacent and downstream of an outlet of the calcining chamber. The temperature sensor is configured to generate a temperature signal indicative of the temperature measured by the temperature sensor.

The temperature signal is transmitted to a controller in operable arrangement with the temperature sensor and the heating unit. The controller is operated to adjust a thermal energy output rate of the heating unit by adjusting at least one variable burner and/or electrical heating element based upon a comparison of the temperature signal and a target set point temperature.

In embodiments, the calcination unit comprises a refractoryless kettle, and the heating unit includes a plurality of variable burners and/or electrical heating elements. In at least some of such embodiments, the step of adjusting the thermal energy output rate of the heating unit comprises adjusting at least two variable burners and/or electrical heating elements. In at least some of such embodiments, the step of adjusting the thermal energy output rate of the heating unit comprises adjusting each one of the variable burners and/or electrical heating elements.

In embodiments, the calcination unit includes an air unit. The method further includes using the air unit to selectively direct a flow of air into the calcining chamber.

In embodiments, feeding the supply of gypsum comprises operating a feeder conveyor to feed the supply of gypsum at a feed rate into the calcining chamber. The adjusting the thermal energy output rate of the heating unit step comprises basing the target set point temperature upon the feed rate of the supply of gypsum entering the calcining chamber. In at least some of such embodiments, the method further includes varying the target set point temperature based upon a change in the feed rate of the supply of gypsum entering the calcining chamber according to a temperature time curve stored in a data storage device associated with the controller. In at least some of such embodiments, the method includes operating the controller to maintain the feed rate of the supply gypsum within a predetermined tolerance of a target feed rate. The adjusting the thermal energy output rate of the heating unit step comprises, in at least some embodiments, basing the target set point temperature upon the target feed rate of the supply of gypsum entering the calcining chamber. In at least some of such embodiments, the target set point temperature within the calcining chamber is less than or equal to 330° F., and in a range between 270° F. and 280° F. in still other embodiments.

All references cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for manufacturing calcined gypsum, the system comprising:

a calcination unit including a calcining chamber and a heating unit associated with the calcining chamber, the calcining chamber including an inlet for receiving a supply of gypsum therethrough and into the calcining chamber and an outlet for discharging the supply of gypsum from the calcining chamber;

a calciner temperature control device including a temperature sensor and a controller in operable arrangement with the temperature sensor and the heating unit, wherein:

the temperature sensor is positioned to detect at least one of the temperature within the calcining chamber and the temperature at a discharge portion adjacent and downstream of the outlet, the temperature sensor configured to generate a temperature signal indicative of the temperature measured by the temperature sensor;

the controller is configured to adjust a thermal energy output rate of the heating unit based upon a comparison of the temperature signal and a target set point temperature;

the calcination unit comprises a refractoryless kettle, and the heating unit includes a plurality of variable heating sources; and the calcination unit includes an air unit configured to direct a flow of air into the calcining chamber.

2. The system for manufacturing calcined gypsum according to claim 1, wherein the controller is configured to adjust the thermal energy output rate of the heating unit by adjusting each one of the plurality of variable heating sources.

3. The system for manufacturing calcined gypsum according to claim 2, wherein the controller is configured to independently adjust each one of the plurality of variable heating sources.

4. The system for manufacturing calcined gypsum according to claim 1, further comprising:

a feeder conveyor configured to feed the supply of gypsum at a feed rate into the calcining chamber;

wherein the target set point temperature is based upon the feed rate of the supply of gypsum entering the calcining chamber.

5. The system for manufacturing calcined gypsum according to claim 4, wherein the controller includes a data storage device, and the controller is configured to vary the target set point temperature based upon a change in the feed rate of the supply of gypsum entering the calcining chamber according to a temperature time curve stored in the data storage device.

6. The system for manufacturing calcined gypsum according to claim 4, further comprising:

a source of gypsum material associated with the feeder conveyor to selectively deliver the supply of gypsum to the feeder conveyor.

7. The system for manufacturing calcined gypsum according to claim 6, further comprising:

a dust collector associated with the calcining chamber to selectively control dust generation within the calcining chamber.

8. The system for manufacturing calcined gypsum according to claim 1, wherein the target set point temperature within the calcining chamber is less than or equal to 330° F.

9. A method for manufacturing calcined gypsum, the method comprising:

feeding a supply of gypsum at a feed rate into a calcining chamber of a calcination unit including a refractoryless kettle with a heating unit having a plurality of variable heaters associated with the calcining chamber, the calcination unit further including an air unit used to selectively direct a flow of air into the calcining chamber;

monitoring temperature within the calcining chamber using a temperature sensor positioned to detect at least one of the temperature within the calcining chamber and the temperature at a discharge portion adjacent and downstream of an outlet of the calcining chamber, the temperature sensor configured to generate a temperature signal indicative of the temperature measured by the temperature sensor;

transmitting the temperature signal to a controller in operable arrangement with the temperature sensor and the heating unit;

operating the controller to adjust a thermal energy output rate of the heating unit by adjusting the plurality of variable heaters of the heating unit based upon a comparison of the temperature signal and a target set point temperature.

10. The method for manufacturing calcined gypsum according to claim 9, wherein adjusting a firing rate of the heating unit comprises adjusting at least two variable burners.

11. The method for manufacturing calcined gypsum according to claim 9, wherein adjusting the thermal energy output rate of the heating unit comprises adjusting each of the plurality of the variable heaters.

12. The method for manufacturing calcined gypsum according to claim 9, wherein feeding the supply of gypsum comprises operating a feeder conveyor to feed the supply of gypsum at a feed rate into the calcining chamber, wherein adjusting the thermal energy output rate of the heating unit comprises basing the target set point temperature upon the feed rate of the supply of gypsum entering the calcining chamber.

13. The method for manufacturing calcined gypsum according to claim 12, the method comprising:

varying the target set point temperature based upon a change in the feed rate of the supply of gypsum entering the calcining chamber according to a temperature time curve stored in a data storage device associated with the controller.

14. The method for manufacturing calcined gypsum according to claim 9, wherein feeding the supply of gypsum comprises operating a feeder conveyor to feed the supply of gypsum at a feed rate into the calcining chamber, the method comprising:

operating the controller to maintain the feed rate of the supply gypsum within a predetermined tolerance of a target feed rate.

15. The method for manufacturing calcined gypsum according to claim 14, wherein adjusting the thermal energy output rate of the heating unit comprises basing the target set point temperature upon the target feed rate of the supply of gypsum entering the calcining chamber.

16. The method for manufacturing calcined gypsum according to claim 15, wherein the target set point temperature within the calcining chamber is less than or equal to 330° F.

17. A system for manufacturing calcined gypsum, the system comprising:

a calcination unit including a calcining chamber and a heating unit associated with the calcining chamber, the calcining chamber including an inlet for receiving a supply of gypsum therethrough and into the calcining chamber and an outlet for discharging the supply of gypsum from the calcining chamber;

a feeder conveyor configured to feed the supply of gypsum at a feed rate into the calcining chamber;

a calciner temperature control device including a temperature sensor and a controller in operable arrangement with the temperature sensor and the heating unit, wherein:

the temperature sensor is positioned to detect at least one of the temperature within the calcining chamber and the temperature at a discharge portion adjacent and downstream of the outlet, the temperature sensor configured to generate a temperature signal indicative of the temperature measured by the temperature sensor;

the controller is configured to adjust a thermal energy output rate of the heating unit based upon a comparison of the temperature signal and a target set point temperature;

the calcination unit comprises a refractoryless kettle, and the heating unit includes a plurality of variable heating sources; and the target set point temperature is based upon the feed rate of the supply of gypsum entering the calcining chamber.

18. The system for manufacturing calcined gypsum according to claim 17, wherein the controller includes a data storage device, and the controller is configured to vary the target set point temperature based upon a change in the feed rate of the supply of gypsum entering the calcining chamber according to a temperature time curve stored in the data storage device.

19. The system for manufacturing calcined gypsum according to claim 17, further comprising:

a source of gypsum material associated with the feeder conveyor to selectively deliver the supply of gypsum to the feeder conveyor.

20. The system for manufacturing calcined gypsum according to claim 19, further comprising:

a dust collector associated with the calcining chamber to selectively control dust generation within the calcining chamber.

* * * * *